Figure 1:
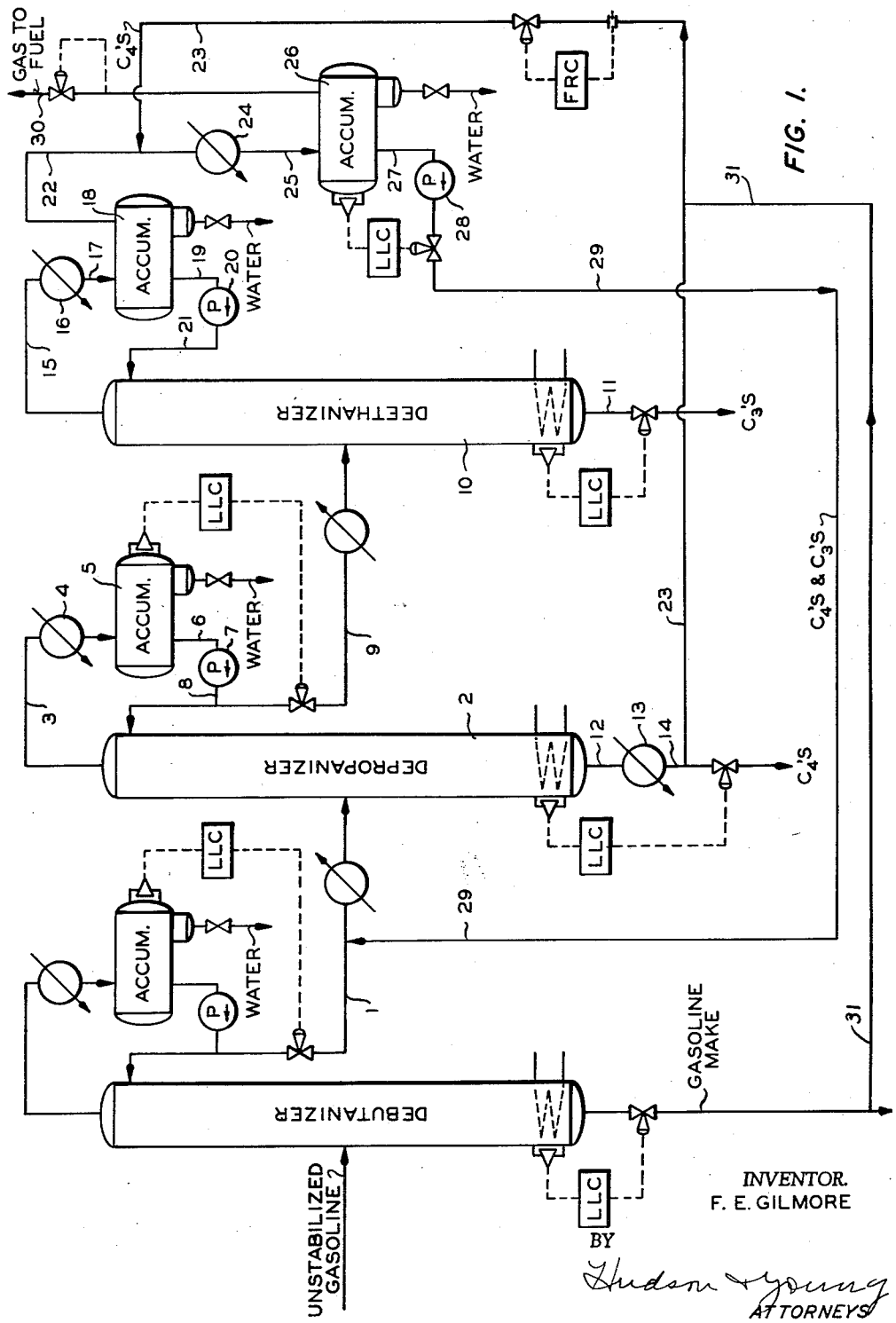

United States Patent Office

2,952,983
Patented Sept. 20, 1960

2,952,983

PROCESSING OF HYDROCARBON GASES

Forrest E. Gilmore, Bartlesville, Okla., assignor to Phillips Petroleum Company, a corporation of Delaware Filed Aug. 28, 1957, Ser. No. 680,773

13 Claims. (Cl. 62—17)

This invention relates to the processing of hydrocarbon gases. In one aspect, the invention relates to a method and apparatus for the separation of a stream of gases containing essentially propane, ethane, and lighter gases into substantially pure propane and a stream of ethane and lighter gases, without the formation of hydrocarbon hydrates ordinarily encountered at low temperatures, by a step-wise condensation employing between two condensing steps a liquid hydrocarbon stream to absorb and to remove from the vapors the propane which unavoidably will be contained therein, the said liquid resulting from the hydrocarbon mixture from which the gases have been derived. In another aspect of the invention, it relates to the recovery of substantially pure propane, a butane fraction and a fraction containing ethane and lighter gases from, say, natural or unstabilized cracked gasoline by debutanizing said gasoline to obtain a mixture of gases essentially containing butane, propane, ethane and gases lighter than ethane and then treating said gases as herein described.

It is well known in the art that there are formed at low temperatures certain hydrocarbon hydrates which cause difficulties in operation due to plugging of valves and other parts of apparatus.

It is an object of this invention to provide a method for processing hydrocarbon gases. It is a further object of this invention to provide a method and apparatus for obtaining from hydrocarbon gases at least one stream of substantially pure hydrocarbon gas without having to employ temperatures so low that hydrate formation occurs. It is a further object of this invention to provide a unitary operation for processing hydrocarbon gases possessing certain economic advantages due to the fact that hydrate formation is avoided without necessary use of materials extraneous to the operation.

Other aspects, objects and advantages of this invention are apparent from a study of this disclosure, the drawing and the appended claims.

Figure 2:
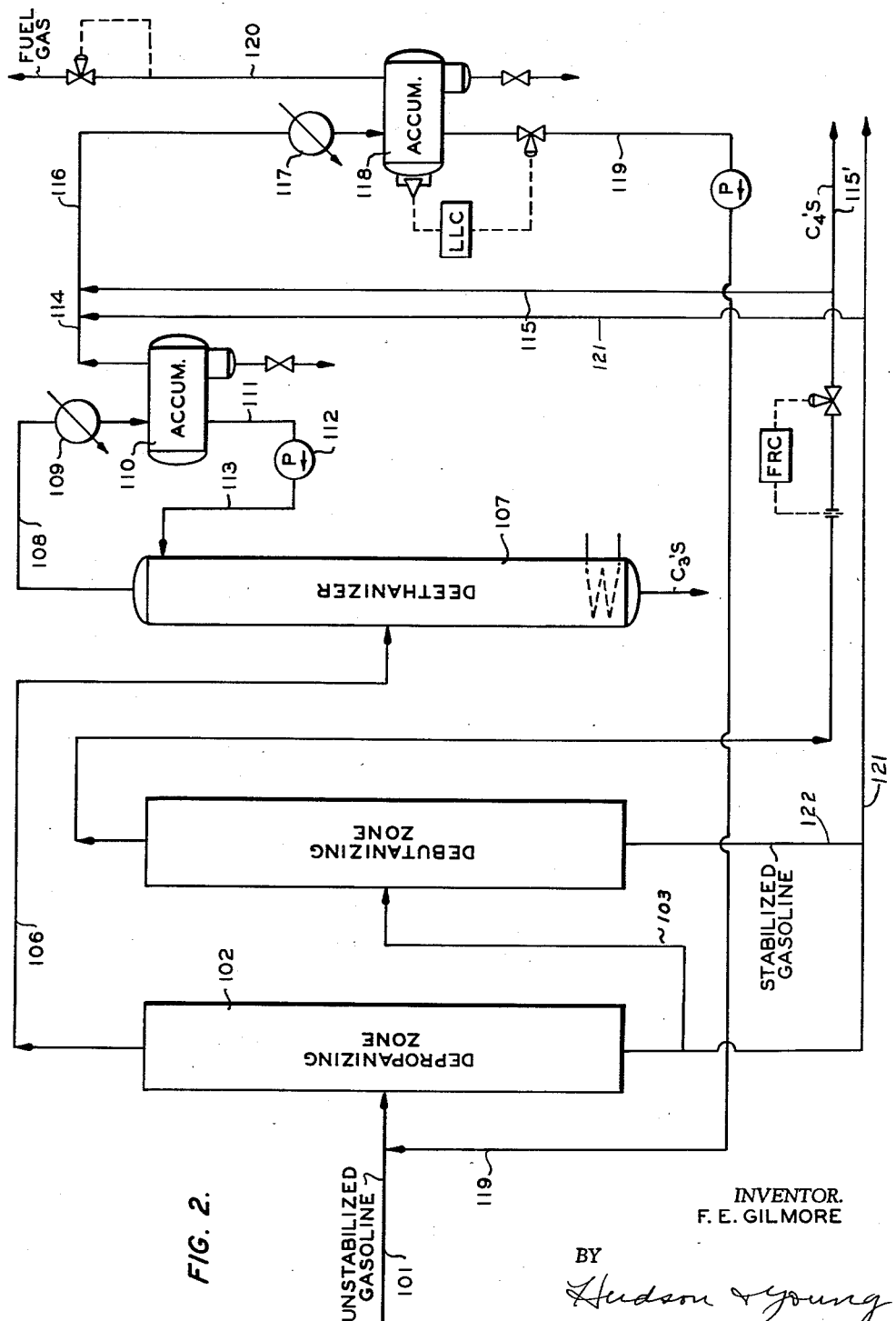

In the drawing, Figures 1 and 2 show, respectively and diagrammatically, operations in which a liquid butane fraction is commingled with a vapor resulting following partial condensation of a deethanizer overhead; and in which a debutanizer overhead is commingled with a resulting vapor also obtained from a deethanizer. In Figure 1, the charge material is first debutanized, whereas in Figure 2 the charge material is first depropanized.

According to this invention, as shown in Figure 1 of the drawing, there is provided an operation in which the overhead from a debutanizer, in which a gasoline has been debutanized, is passed to a depropanizer from which there is obtained as bottoms a cold butane stream and as overhead a liquid stream containing propane, ethane, and lighter gases. This liquid is deethanized in a deethanizer from which there is obtained as bottoms a propane stream and as overhead a stream containing propane, ethane and lighter gases. The overhead is fractionally condensed in at least two stages and intermediate the two stages vapors from which a substantial amount, but not all, of the propane, has been removed are commingled with the liquid butane obtained as bottoms from the depropanizer. The liquid butane removes from the vapors into solution in itself a greater part of the remaining propane yielding ethane and lighter gases.

Further according to the invention, referring now to Figure 1 of the drawing, the charge 1, which is the debutanizer overhead, enters depropanizer 2, is separated into a bottoms portion containing butanes removed by way of pipe 12, cooler 13, pipe 14, and an overhead portion containing propane and lighter. It is desired to recover the propane without hydrate formation. In this specific embodiment, the depropanizer overhead make obtained by way of pipe 3, condenser 4, accumulator 5, line 6, pump 7 and line 8 is charged through line 9 to the deethanizer 10. Propane is recovered as bottoms product from the deethanizer through pipe 11. The overhead vapors from the deethanizer usually including hydrogen sulfide therein are passed through pipe 15 via a condenser 16, operated at a temperature above that at which hydrates form, and the partially condensed material is passed by way of pipe 17 to the first accumulator 18 of two accumulators operated in tandem.

Liquid from this accumulator is returned on liquid level control (not shown) as deethanizer reflux liquid by way of pipe 19, pump 20 and pipe 21. Vapors from the accumulator 18, unavoidably containing a substantial portion of propane due to my conditions of operation are passed by way of pipe 22, and are contacted in commingling relationship with cooled liquid recovered from a portion of the depropanizer bottoms by way of pipe 23. This mixture is passed through an overhead condenser 24, usually operated at the same temperature as the above-mentioned condenser 16, and the resulting material is passed by pipe 25 to overhead accumulator 26. Liquid from this latter accumulator, containing propane removed from the overhead vapor product along with bottoms from the depropanizer, is passed on liquid level control by way of pipe 27, pump 28 and pipe 29 to pipe 1 and then to the depropanizer with the feed to the depropanizer or to a tray which approximates this liquid composition. A gas, substantially ethane and lighter, is recovered from this second overhead accumulator by way of pipe 30.

One set of specific conditions and operating data which applies to the above-described embodiment of the invention, and which here is given by way of example, is as follows:

SPECIFIC EXAMPLE

In accordance with this invention, a gasoline, e.g., a sour (hydrogen sulfide-containing) unstabilized cracked gasoline produced by catalytically cracking a gas oil, is processed under the folowing operating conditions employed on the fractionation facilities:

Debutanizer:
  Top pressure, p.s.i.g _____ 157
  Top temperature, ° F. _____ 135
  Bottom pressure, p.s.i.g _____ 162
  Bottom temperature, ° F. _____ 400
  Accumulator pressure, p.s.i.g. _____ 152
  Accumulator temperature, ° F. _____ 95

Depropanizer:
  Top pressure, p.s.i.g. _____ 185
  Top temperature, ° F. _____ 110
  Bottom pressure, p.s.i.g. _____ 190
  Bottom temperature, ° F. _____ 210
  Accumulator pressure, p.s.i.g. _____ 180
  Accumulator temperature, ° F. _____ 95

Deethanizer:
    Top pressure, p.s.i.g. ---------------------- 505
    Top temperature, °F. ---------------------- 113
    Bottom pressure, p.s.i.g. ------------------- 508
    Bottom temperature, °F. ------------------- 192

Accumulator 18:
    Pressure, p.s.i.g. -------------------------- 500
    Temperature, °F. --------------------------- 95

Accumulator 26:
    Pressure, p.s.i.g. -------------------------- 495
    Temperature, °F. --------------------------- 95

In a typical conventional operation at conditions wherein hydrates do not form, e.g. 500 p.s.i.g. and 95° F. on this above-described charge stock, stream 22 yields as the fuel gas having the following quantity and composition (all compositions below having $H_2S$ present, but which is not shown in the analyses):

| Component | Mols/hr. | Mol percent |
|---|---|---|
| Ethane | 30.5 | 75.3 |
| Propylene | 6.0 | 14.8 |
| Propane | 4.0 | 9.9 |
| Total | 40.5 | 100.0 |

In conventional processing, to yield a fuel gas of about the same composition of that which is produced in practicing this invention, the deethanizer overhead accumulator operates at about 70° F. at the 500 p.s.i.g. This condition results in hydrate formation which cannot be tolerated. Furthermore, excessive refrigeration costs are present in such operations.

In practicing the system of the invention, wherein in the specific example 10 mols of butanes 23 are introduced for each 100 mols of vapor 22 (the 100 mols of vapor including 44.8 mols of recycle ethane), the following stream analyses are shown (all compositions below having $H_2S$ present, but which is not shown in the analyses):

*Stream 22*

| Component | Mols/hr. | Mol percent |
|---|---|---|
| Ethane | [1] 75.3 | 75.3 |
| Propylene | 14.8 | 14.8 |
| Propane | 9.9 | 9.9 |
| Total | 100.0 | 100.0 |

[1] Includes 44.8 mols recycle ethane.

*Stream 29*

| Component | Mols/hr. | Mol percent |
|---|---|---|
| Ethane | 44.8 | 61.5 |
| Propylene | 11.3 | 15.5 |
| Propane | 7.8 | 10.6 |
| Butanes | 9.1 | 12.4 |
| Total | 73.0 | 100.0 |

*Stream 30*

| Component | Mols/hr. | Mol percent |
|---|---|---|
| Ethane | 30.5 | 82.5 |
| Propylene | 3.5 | 9.4 |
| Propane | 2.1 | 5.7 |
| Butanes | 0.9 | 2.4 |
| Total | 37.0 | 100.0 |

From the above-tabulated data, it can be readily seen that in operating according to the invention as compared with the conventional operation wherein no hydrate formation occurs there are yielded only 37.0 mols of fuel gas as compared to 40.5 mols conventionally yielded. Furthermore, the fuel gas of the invention is leaner of the valuable propylene and propane constituents, affording a saving of 2.5 mols per hour of propylene and 1.9 mols per hour of propane, or a mol percent saving of 41.6 and 47.5, respectively, of propylene and of propane.

Still further according to the invention, referring now to Figure 2 of the drawing, the charge of unstabilized gasoline is passed via line 101 along with a butane-propane stream 119, described hereinbelow, to depropanizing zone 102 in which the feed is separated into a bottoms portion 103 containing butanes and heavier and an overhead portion 106 containing propane and lighter. It is desired to recover propane without hydrate formation. In this specific embodiment, the stream of butanes and heavier 103 is charged to a debutanizing zone 104 from which a bottoms product of stabilized gasoline is yielded by way of 105, and an overhead stream of essentially butane is removed via 115. A portion of the butane stream 115 is yielded via line 115'. The overhead 106 containing propane and lighter is charged to deethanizer 107. From this deethanizer 107, a bottoms yield comprising essentially propane is removed via line 107'. The overhead from deethanizer 107 is removed via 108, partially condensed in heat exchanger 109 and is passed to overhead accumulator 110. Conditions in this condensing step are regulated so as to prevent hydrate formation and to unavoidably leave excess propane uncondensed. Liquid from accumulator 110 comprising propane is passed by way of line 111, pump 112, and line 113 as reflux for deethanizer 107. The overhead vapors from accumulator 110 are passed through pipe 114 and unavoidably contain a substantial proportion of propane as above-mentioned. This overhead vapor stream 114 is contacted in commingling relationship with the butane introduced thereinto via line 115 from the overhead of the debutanizing zone. The mixture is passed through overhead condenser 117 via line 116 and into the second accumulator 118. Liquid from accumulator 118, containing propane removed from the overhead vapor product along with the overhead from debutanizer 104, is passed by way of line 119 into pipe 101 and then to the depropanizing zone 102 as above-described along with the charge fluid 101. A gas, substantially ethane and lighter, is recovered from this second overhead accumulator 118 by way of pipe 120.

Thus according to the present invention, a hydrocarbon mixture containing butane, propane, and lighter gases is debutanized, depropanized and deethanized obtaining a fraction containing propane and lighter gases and a stream containing essentially butane; the fraction containing propane is partially condensed under conditions avoiding formation of hydrates to obtain a resulting vapor fraction; the resulting vapor fraction, which unavoidably contains propane and contains lighter gases, is commingled with said stream containing butane so as to obtain ultimately a fuel gas containing a greatly reduced propane content and a butane stream containing propane removed from said resulting vapor; and the stream containing butane and propane is returned to the system.

Furthermore, the practice of the invention is not limited to an unstabilized catalytically cracked gasoline as illustrated in the specific example above. This invention is applicable to any distillable material wherein hydrates can be formed in the fractionation steps due to low temperature operations on the overhead accumulators wherein light vapors, e.g., methane, ethane, ethylene, propylene, propane, etc., are present along with moisture, and in particular also in the presence of hydrogen sulfide. Such materials which can advantageously be processed according to the invention include: catalytically cracked gasolines, thermally cracked gasolines, natural gasoline, etc.

Although in the description of the specific embodiment of this invention liquid butane from the depropanizer is commingled with the vapor stream intermediate accumulator 18 and condenser 24, it is within the scope of the invention to use as the commingling liquid the bottoms from a debutanizer, operating to debutanize gasoline, or, for that matter, any other cold gaseous or liquid stream obtained in the process which will act to condense the propane, or other gas which it is desired to thus condense, and from which fluid or liquid the condensed gas can be suitably recovered.

Thus, by way of further example, referring now to Figure 1, debutanized gasoline can be passed by line 31 to line 22 by way of line 23 for commingling with the vapors therein thus to recover the propane therein. Also, by way of further example, referring now to Figure 2, debutanized gasoline and/or depropanized gasoline can be passed by way of pipes 122 and/or 121 to pipe 114 for recovery of propane therein.

It will be understood by those skilled in the art that the drawing of one specific embodiment of the invention, though it shows certain pieces of apparatus, is for illustrative purposes and is not intended to include all of the operational apparatus details which one skilled in the art will routinely supply. Furthermore, the showing of condensers does not mean that all condensers which may be supplied have been shown. Similarly, for other pieces of apparatus. Still further, while there have been shown a tandem arrangement of two accumulators each respectively associated with a condenser, it is within the scope of this invention to employ other forms of apparatus. For example, a simple arrangement of coils with an intermediate liquid withdrawal can be used to obtain the vapor stream to which is added the cold fluid or liquid, as will be understood by those skilled in the art. Thus, according to the concept of the invention which has been described, the gases are ultimately separated without hydrate formation or other temperature difficulty whatever it may be by only partially condensing the deethanizer overhead, removing condensate and then further condensing or liquefying remaining vapors by admixture of a cold stream of fluid or liquid, in one embodiment of the invention obtained from the system itself.

The advantages of the present invention will be apparent when it is considered that there has been provided a unitary operation in which it is possible to avoid several of the disadvantages attendant upon operation at low temperatures without increasing the overall refrigeration required. Indeed, simple calculations will show that the extremely low temperatures which are only expensively reached are avoided and that the overall refrigeration requirement or cost is greatly reduced.

Reasonable variation and modification are possible within the scope of the foregoing disclosure, drawing and the appended claims to the invention, the essence of which is that there have been provided a method and apparatus for separation of gases, especially hydrocarbon gases, avoiding problems attendant upon hydrate formation and other problems and expense connected with low temperature operation by step-wise condensing a vaporous mixture of gases in a plurality of steps intermediate two of which remaining vapors are further condensed by admixture of a cold fluid or liquid with said vapors, the said cold fluid being obtained in the process from which the said gases are derived.

I claim:

1. A hydrocarbon separation method wherein a light component is separated from a heavy component without excessive loss of intermediate component and without hydrate formation, which comprises fractionating a hydrocarbon stream in a first fractionation step to obtain a liquid bottoms fraction and an overhead fraction containing said light and said intermediate components, fractionating said overhead fraction in a second fractionation step to obtain a bottoms fraction comprising substantially pure intermediate component as product of the process and an overhead fraction containing said light component with a small proportion of said intermediate component, condensing said resulting overhead fraction at a temperature above a temperature at which hydrates form, separating from said resulting condensed overhead fraction a vapor fraction containing said light component and a small proportion of said intermediate component unavoidably retained in said vapors, commingling said resulting vapor fraction with said liquid bottoms fraction, separating a resulting condensed stream to obtain a vapor fraction comprising essentially only said light component and a liquid fraction containing said intermediate component and said commingled liquid, and returning said resulting liquid fraction to said first fractionation step.

2. A hydrocarbon separation method wherein according to claim 1 the hydrocarbon stream which is fractionated in said first fractionation step comprises butane, propane, ethane, and lighter gases.

3. A method according to claim 1 wherein said overhead fraction containing said light component with a small proportion of said intermediate component unavoidably left therein is condensed in a condensing zone and passed to an accumulator zone wherein liquid and vapor are separated and wherein the vapor thus separated is further condensed in a condensing zone following commingling of the liquid bottoms fraction therewith and then passed to another accumulating zone for separation of the light component and the said liquid fraction.

4. A method for the recovery of substantially pure gas stream in the production of gasoline which comprises fractionating a gasoline to remove therefrom a stream containing essentially butane, propane, ethane and lighter gases, in a depropanizer zone separating from the mixture, comprising butane, propane, ethane and lighter gases, a liquid butane fraction used as later herein described, removing from the depropanizer zone a vaporous fraction containing propane, ethane and lighter gases, in a deethanizer zone processing said vaporous fraction to recover therefrom as a product of the process a propane stream, also recovering from said deethanizer zone a vaporous fraction containing some propane, ethane and lighter gases, cooling said vaporous fraction to form some condensate, returning said condensate to said deethanizer zone, recovering vapor separated from said condensate upon its formation and commingling said vapors with said liquid butane fraction under conditions causing substantially all of the propane in said vapors to be absorbed in said liquid butane, separating a vaporous fraction containing substantially only ethane and lighter gases as a product of the process, and recovering liquid butane containing said propane and returning the same to said depropanizer zone.

5. A method according to claim 4 wherein said liquid butane fraction containing said propane is at least in part returned to the debutanizer zone.

6. A method for the recovery of a substantially pure gas stream from a gasoline which comprises fractionating a gasoline to debutanize the same, obtaining a debutanizer bottoms fraction and a gas stream containing some butane, propane, ethane and lighter gases, in a depropanizer zone separating from the mixture, comprising butane, propane, ethane and lighter gases, a liquid butane fraction, removing from the depropanizer zone a vaporous fraction containing propane, ethane and lighter gases, in a deethanizer zone processing said vaporous fraction to recover therefrom as a product of the process a propane stream, also recovering from said deethanizer zone a vaporous fraction containing some propane, ethane and lighter gases, cooling said vaporous fraction to form some condensate, returning said condensate to said deethanizer zone, recovering vapors separated from said condensate upon its formation and commingling said vapors with at least a portion of one of said debutanizer bottoms and said liquid butane fraction under conditions causing substantially all of the propane in said vapors to be absorbed in said liquid commingled with said vapors, separating a vaporous fraction containing substantially only ethane and lighter gases as a product of the process, and recovering a liquid containing said propane and returning the same to the system for further treatment.

7. A depropanizer, a deethanizer and a plurality of condenser-accumulators, a conduit for conducting overhead from the depropanizer to the deethanizer a conduit for conducting deethanizer overhead to one of said condenser-accumulators, a conduit for conducting vapors from said condenser-accumulator to another condenser-accumulator, a conduit for removing liquid from said accumulator, a conduit for conducting depropanizer bottoms to said conduit for conducting vapors to said another condenser-accumulator, a conduit for conducting bottoms from said another condenser-accumulator to said depropanizer and a conduit for removing vapors from said another condenser-accumulator.

8. Apparatus comprising, in combination, a debutanizer, a depropanizer, a deethanizer and a plurality of condenser-accumulators, a conduit for conducting overhead from the debutanizer to the depropanizer, a conduit for conducting overhead from the depropanizer to the deethanizer, a conduit for conducting overhead from the deethanizer to one of said condenser-accumulators, a conduit for conducting vapors from said condenser-accumulator to another of said condenser-accumulators, a conduit for conducting debutanizer bottoms to said conduit for conducting vapors to said another condenser-accumulator, a conduit for conducting bottoms from said another condenser-accumulator to said debutanizer and a conduit for removing vapors from said another condenser-accumulator.

9. A method for recovering a substantially pure gas stream from a gasoline-like mixture of hydrocarbons which comprises depropanizing, debutanizing, and deethanizing said mixture to obtain a fraction containing propane and lighter gases and a stream containing essentially butane, partially condensing said fraction under conditions avoiding formation of hydrates to obtain a resulting vapor fraction, commingling said resulting vapor fraction which unavoidably contains propane and contains lighter gases, and said stream containing butane so as to obtain ultimately a fuel gas containing a greatly reduced propane content and a butane stream containing propane removed from said resulting vapor, and returning said stream containing butane and propane to the system.

10. An apparatus comprising means for fractionation of a distillable material, a plurality of means, for receiving, condensing and accumulating overhead from said means for fractionation, means for conducting from a first of said plurality of means vapors not therein condensed to a second of said plurality of means, means for removing condensate from said first of said plurality of means, means for removing and conducting bottoms from said means for fractionation into said second of said plurality of means, means for conducting condensate from said second of said plurality of means to said means for fractionation, and means for removing vapors from said second of said plurality of means.

11. A method for obtaining from a mixture of hydrocarbons, containing butane, ethane, and propane and hydrocarbons heavier than butane, substantially pure propane, which comprises fractionating said hydrocarbons to obtain a stream containing essentially the hydrocarbons heavier than butane, a stream containing essentially butane, and a stream containing propane and ethane, fractionating said stream containing propane and ethane to obtain a stream of substantially pure propane as a bottoms, and a stream of ethane containing unavoidably some propane as an overhead stream, partially condensing said overhead stream to obtain therefrom a condensate containing some ethane and propane and an uncondensed stream of vapors containing ethane and propane, commingling said stream of vapors with at least a portion of one of said stream containing hydrocarbons heavier than butane and said stream containing essentially butane, absorbing propane into the commingled stream, thus obtaining a residual vaporous stream containing essentially ethane, and returning the commingled stream and the propane contained therein to the system.

12. A method of fractionating a distillable material to separate it into several fractions, including a light fraction, a pure intermediate fraction, and a heavier fraction, which comprises the steps in combination as follow, fractionating said material in a fractionation zone, to obtain said light fraction, pure intermediate fraction, and heavier fraction, said light fraction containing a portion of a constituent of said pure intermediate fraction, partially condensing said light fraction containing said constituent to obtain a condensate containing a component of said light fraction and some of said constituent and a vaporous fraction containing essentially said light component and some of said constituent, commingling at least a portion of said heavier fraction with said vaporous fraction under conditions effective to absorb from said vaporous fraction said constituent therein, thus obtaining a residual vaporous fraction containing said light component, and returning said heavier fraction and its absorbed constituent to the system.

13. An apparatus comprising means for fractionation of a distillable material, a plurality of means, for receiving, condensing and accumulating overhead from said means for fractionation, means for conducting from a first of said plurality of means vapors not therein condensed to a second of said plurality of means, means for removing condensate from said first of said plurality of means, means for removing and conducting a fraction from said means for fractionation into said second of said plurality of means, means for conducting condensate from said second of said plurality of means to said means for fractionation, and means for removing vapors from said second of said plurality of means.

References Cited in the file of this patent

UNITED STATES PATENTS

| | | |
|---|---|---|
| 1,951,840 | Roberts | Mar. 20, 1934 |
| 2,059,494 | Shires | Nov. 3, 1936 |
| 2,250,949 | Gerlach | July 29, 1941 |
| 2,497,421 | Shirds | Feb. 14, 1950 |
| 2,500,353 | Gantt | Mar. 14, 1950 |
| 2,780,580 | Kneil | Feb. 5, 1957 |
| 2,886,611 | King | May 12, 1959 |